United States Patent
Zhang et al.

(10) Patent No.: US 10,333,351 B2
(45) Date of Patent: Jun. 25, 2019

(54) DRIVING CIRCUIT FOR DRIVING N TRANSMITTER-SIDE COUPLING CIRCUITS AND WIRELESS POWER TRANSMITTER INCLUDING THE SAME

(71) Applicant: Silergy Semiconductor Technology (Hangzhou) Ltd., Hangzhou (CN)

(72) Inventors: Wang Zhang, Hangzhou (CN); Wei Chen, Hangzhou (CN); Chen Zhao, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 186 days.

(21) Appl. No.: 15/211,073

(22) Filed: Jul. 15, 2016

(65) Prior Publication Data

US 2017/0018970 A1    Jan. 19, 2017

(30) Foreign Application Priority Data

Jul. 17, 2015   (CN) .......................... 2015 1 0424925

(51) Int. Cl.
  *H02J 50/12*    (2016.01)
  *H02J 7/02*    (2016.01)
  *H02M 7/5387*   (2007.01)
  *H02M 7/5395*   (2006.01)
  *H02M 1/00*    (2006.01)

(52) U.S. Cl.
  CPC ............. *H02J 50/12* (2016.02); *H02J 7/025* (2013.01); *H02M 7/5387* (2013.01); *H02M 7/5395* (2013.01); *H02M 2001/007* (2013.01)

(58) Field of Classification Search
  CPC ........ H02J 50/12; H02J 7/025; H02M 7/5395; H02M 7/5387; H02M 2001/007
  See application file for complete search history.

(56) References Cited

U.S. PATENT DOCUMENTS

| | | | | |
|---|---|---|---|---|
| 9,680,398 B2* | 6/2017 | Moes | ................... | H02M 7/5387 |
| 2010/0188041 A1* | 7/2010 | Mizuo | ................... | H02J 7/0021 |
| | | | | 320/108 |
| 2015/0022147 A1* | 1/2015 | Jung | ....................... | H02J 5/005 |
| | | | | 320/108 |
| 2015/0115730 A1* | 4/2015 | Kanno | ................... | H02J 5/005 |
| | | | | 307/104 |
| 2015/0145473 A1* | 5/2015 | Shen | ....................... | H02J 7/007 |
| | | | | 320/108 |
| 2016/0285278 A1* | 9/2016 | Mehas | .................... | H02J 50/12 |

FOREIGN PATENT DOCUMENTS

| | | | |
|---|---|---|---|
| CN | 103337914 A | * | 10/2013 |
| CN | 103683530 A | | 3/2014 |
| CN | 104701998 A | | 6/2015 |
| CN | 105099002 A | | 11/2015 |

* cited by examiner

*Primary Examiner* — Jared Fureman
*Assistant Examiner* — Michael J Warmflash
(74) *Attorney, Agent, or Firm* — Westman, Champlin & Koehler, P.A.

(57) ABSTRACT

The present disclosure relates to a driving circuit and a wireless power transmitter including the same. N+1 half-bridge circuits constitute N full-bridge circuits by reusing the half-bridge circuits, so as to drive a plurality of coils for wirelessly charging a plurality of loads.

16 Claims, 7 Drawing Sheets

N;

DRIVING CIRCUIT FOR DRIVING N TRANSMITTER-SIDE COUPLING CIRCUITS AND WIRELESS POWER TRANSMITTER INCLUDING THE SAME

CROSS-REFERENCE TO RELATED APPLICATION

This application claims the benefit of Chinese Patent Application No. 201510424925.3, filed on Jul. 17, 2015, which is incorporated herein by reference in its entirety.

BACKGROUND OF THE DISCLOSURE

Field of the Disclosure

The present disclosure generally relates to the field of power electronics, and more particularly, to wireless power transmission, and further more particularly, to a driving circuit and a wireless power transmitter including the same.

Background of the Disclosure

Wireless power transmission is also referred to as non-contact power transmission, which transfers electric energy by coupling between a power transmitter and a power receiver in a non-contact manner by electromagnetic induction or magnetic resonance. For the beneficial effect of convenience and availability, the wireless power transmission is widely used in electronic products such as mobile phones, MP3 players, digital cameras, portable computers, and low-power household appliances.

The conventional wireless power transmitter includes only one transmitter-side coupling circuit and cannot supply electric energy in a wireless manner to a plurality of loads.

SUMMARY OF THE DISCLOSURE

In view of this, the present disclosure provides a driving circuit and a wireless power transmitter including the same, for supplying electric energy in a wireless manner to a plurality of loads with a relatively small circuit scale.

According to one aspect of the present disclosure, there is provided a driving circuit for driving N transmitter-side coupling circuits at a wireless power transmitter, where N is an integer larger than or equal to 2, comprising:

an inverting circuit comprising N+1 half-bridge circuits which are connected in parallel at input terminals, wherein each of the N+1 half-bridge circuits has an output terminal, and the output terminal of an i-th half-bridge circuit and the output terminal of an (i+1)-th half-bridge circuit are coupled with an i-th transmitter-side coupling circuit, where i=1, 2, . . . , N;

a control circuit being configured to control on and off states of switches in the N+1 half-bridge circuits so that the N transmitter-side coupling circuits transfer electric energy simultaneously, alternately, or independently.

Preferably, the control circuit comprises:

a configuration interface being configured to receive a driving mode of the wireless power transmitter;

wherein the control circuit is configured to control on and off states of the switches in the N+1 half-bridge circuits in accordance with the driving mode so that the N transmitter-side coupling circuits transfer electric energy simultaneously, alternately, or independently.

Preferably, each of the N+1 half-bridge circuits comprises a first switch and a second switch;

the control circuit is configured to control the first switch in the i-th half-bridge circuit and the second switch in the (i+1)-th half-bridge circuit in accordance with a first pulse-width modulation signal, and to control the second switch in the i-th half-bridge circuit and the first switch in the (i+1)-th half-bridge circuit in accordance with a second pulse-width modulation signal, so as to drive the i-th transmitter-side coupling circuit to transfer energy;

the control circuit is further configured to control the first switches in the 1-st to the (i−1)-th half-bridge circuits to be synchronize with the first switch in the i-th half-bridge circuit, and to control the second switches in the 1-st to the (i−1)-th half-bridge circuits to be synchronize with the second switch in the i-th half-bridge circuit, to control the first switches in the (i+2)-th to the (N+1)-th half-bridge circuits to be synchronize with the first switch in the (i+1)-th half-bridge circuit, and to control the second switches in the (i+2)-st to the (N+1)-th half-bridge circuits to be synchronize with the second switch in the (i+1)-th half-bridge circuit, so that the transmitter-side coupling circuits, except for said i-th transmitter-side coupling circuit, do not transfer electric energy;

wherein the first pulse-width modulation signal and the second pulse-width modulation signal are complementary signals with or without a dead zone.

Preferably, each of the N+1 half-bridge circuits comprises a first switch and a second switch;

the control circuit is configured to control the first switch in the i-th half-bridge circuit and the second switch in the (i+1)-th half-bridge circuit in accordance with a first pulse-width modulation signal, and to control the second switch in the i-th half-bridge circuit and the first switch in the (i+1)-th half-bridge circuit in accordance with a second pulse-width modulation signal, so as to drive the i-th transmitter-side coupling circuit to transfer energy;

the control circuit is further configured to control the first switch and the second switch in the half-bridge circuits, except for the i-th half-bridge circuit and the (i+1)-th half-bridge circuit, to be turned off, so that the transmitter-side coupling circuits, except for the i-th transmitter-side coupling circuit, do not transfer electric energy, wherein the first pulse-width modulation signal and the second pulse-width modulation signal are complementary signals with or without a dead zone.

Preferably, each of the N+1 half-bridge circuits comprises a first switch and a second switch;

the control circuit is configured to control the first switch in the j-th half-bridge circuit and the second switch in the k-th half-bridge circuit in accordance with a first pulse-width modulation signal, and to control the second switch in the j-th half-bridge circuit and the first switch in the k-th half-bridge circuit in accordance with a second pulse-width modulation signal, to drive all of the transmitter-side coupling circuits to transfer energy simultaneously, where j is any odd number in 1 to N+1 and k is any even number in 1 to N+1, wherein the first pulse-width modulation signal and the second pulse-width modulation signal are complementary signals with or without a dead zone.

Preferably, the control circuit is configured to drive a transmitter-side coupling circuits to transfer electric energy in each cycle;

wherein the wireless power transmitter further comprises:

a detection circuit being configured to detect whether the transmitter-side coupling circuit which is active in a current cycle is electrically coupled to a load which needs electric energy or not;

wherein in a case that the detection circuit determines that the transmitter-side coupling circuit which is active in the current cycle is electrically coupled to the load which needs electric energy, the control circuit is configured to control the inverting circuit to drive the transmitter-side coupling circuit which is active in the current cycle to transfer electric energy continuously, until the detection circuit detects that the load is disconnected or does not need electric energy, and to drive next one transmitter-side coupling circuit in sequence to transfer electric energy in next one cycle.

Preferably, the control circuit is configured to drive a transmitter-side coupling circuits to transfer electric energy in each cycle;

wherein the wireless power transmitter further comprises:

a detection circuit being configured to detect whether the transmitter-side coupling circuit which is active in a current cycle is electrically coupled to a load which needs electric energy or not;

wherein in a case that the detection circuit determines that the transmitter-side coupling circuit which is active in the current cycle is electrically coupled to the load which needs electric energy, the control circuit is configured to control the inverting circuit to drive the transmitter-side coupling circuit which is active in the current cycle to transfer electric energy continuously until a predetermined number of cycles elapse, and to drive next one transmitter-side coupling circuit in sequence to transfer electric energy after the predetermined number of cycles elapse.

Preferably, the wireless power transmitter further comprises:

a detection circuit being configured to detect whether one of the transmitter-side coupling circuits is electrically coupled to a load which needs electric energy or not, wherein in a case that the detection circuit determines that the transmitter-side coupling circuit which is active in the current cycle is electrically coupled to the load which needs electric energy, the control circuit is configured to control the inverting circuit to drive all of the transmitter-side coupling circuits to transfer electric energy continuously, until the detection circuit detects that the load is disconnected or does not need electric energy.

Preferably, the control circuit turns off the inverting circuit until a predetermined reset time elapses before switching the transmitter-side coupling circuit which is active.

Preferably, the configuration interface is configured to receive an enable signal for enabling one of the transmitter-side coupling circuits;

the control circuit is configured to drive one of the transmitter-side coupling circuits which has been enabled to transfer electric energy;

wherein the wireless power transmitter further comprises:

a detection circuit being configured to detect whether the enabled transmitter-side coupling circuit which is active in a current cycle is electrically coupled to a load which needs electric energy or not, wherein in a case that the detection circuit determines that the enabled transmitter-side coupling circuit which is active in the current cycle is electrically coupled to the load which needs electric energy, the control circuit is configured to control the inverting circuit to drive the enabled transmitter-side coupling circuit which is active in the current cycle to transfer electric energy continuously, until the detection circuit detects that the load is disconnected or does not need electric energy, and to drive next one enabled transmitter-side coupling circuit in sequence to transfer electric energy in next one cycle.

Preferably, the configuration interface is configured to receive an enable signal for enabling one of the transmitter-side coupling circuits;

the control circuit is configured to drive one of the transmitter-side coupling circuits which has been enabled to transfer electric energy;

wherein the wireless power transmitter further comprises:

a detection circuit being configured to detect whether the enabled transmitter-side coupling circuit which is active in a current cycle is electrically coupled to a load which needs electric energy or not, wherein in a case that the detection circuit determines that the enabled transmitter-side coupling circuit which is active in the current cycle is electrically coupled to the load which needs electric energy, the control circuit is configured to control the inverting circuit to drive the enabled transmitter-side coupling circuit which is active in the current cycle to transfer electric energy continuously until a predetermined number of cycles elapse, and to drive next one enabled transmitter-side coupling circuit in sequence to transfer electric energy after the predetermined number of cycles elapse.

Preferably, in a case that the detection circuit detects none of the transmitter-side coupling circuits is electrically coupled to the load which needs electric energy, the control circuit controls the wireless power transmitter in a standby state for a predetermined time period.

Preferably, in a case that the detection circuit detects none of the enabled transmitter-side coupling circuits is electrically coupled to the load which needs electric energy, the control circuit controls the wireless power transmitter in a standby state for a predetermined time period.

Preferably, the detection circuit detects the load by detecting fluctuation in the transmitter-side coupling circuits, or by receiving a signal from a communication module under a short-range wireless communication protocol.

Preferably, the driving circuit comprises:

a DC-DC converter being electrically coupled between power supply terminals and input terminals of the inverting circuit, and being configured to adjust an input voltage of the inverting circuit in accordance with the load.

According to the other aspect of the present disclosure, there is provided a wireless power transmitter including the above-mentioned driving circuit.

In the present disclosure, N+1 half-bridge circuits constitute N full-bridge circuits by reusing the half-bridge circuits, so as to drive a plurality of coils for wirelessly charging a plurality of loads.

BRIEF DESCRIPTION OF THE DRAWINGS

The above and other objects, advantages and features of the present disclosure will become more fully understood from the detailed description given hereinbelow in connection with the appended drawings, and wherein.

DETAILED DESCRIPTION OF THE DISCLOSURE

Reference will now be made in detail to particular embodiments of the disclosure, it will be understood that the scope of the present disclosure is not limited to these embodiments. Furthermore, in the following detailed description of the present disclosure, numerous specific details are set forth in order to provide a thorough understanding of the present disclosure. However, it will be readily apparent to one skilled in the art that the present disclosure may be practiced without these specific details. In other instances, well-known methods, procedures, processes, components, and circuits have not been described in detail so as not to unnecessarily obscure aspects of the present disclosure.

Furthermore, it will be understood by one skilled in the art that attached drawings are to be regarded as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1:
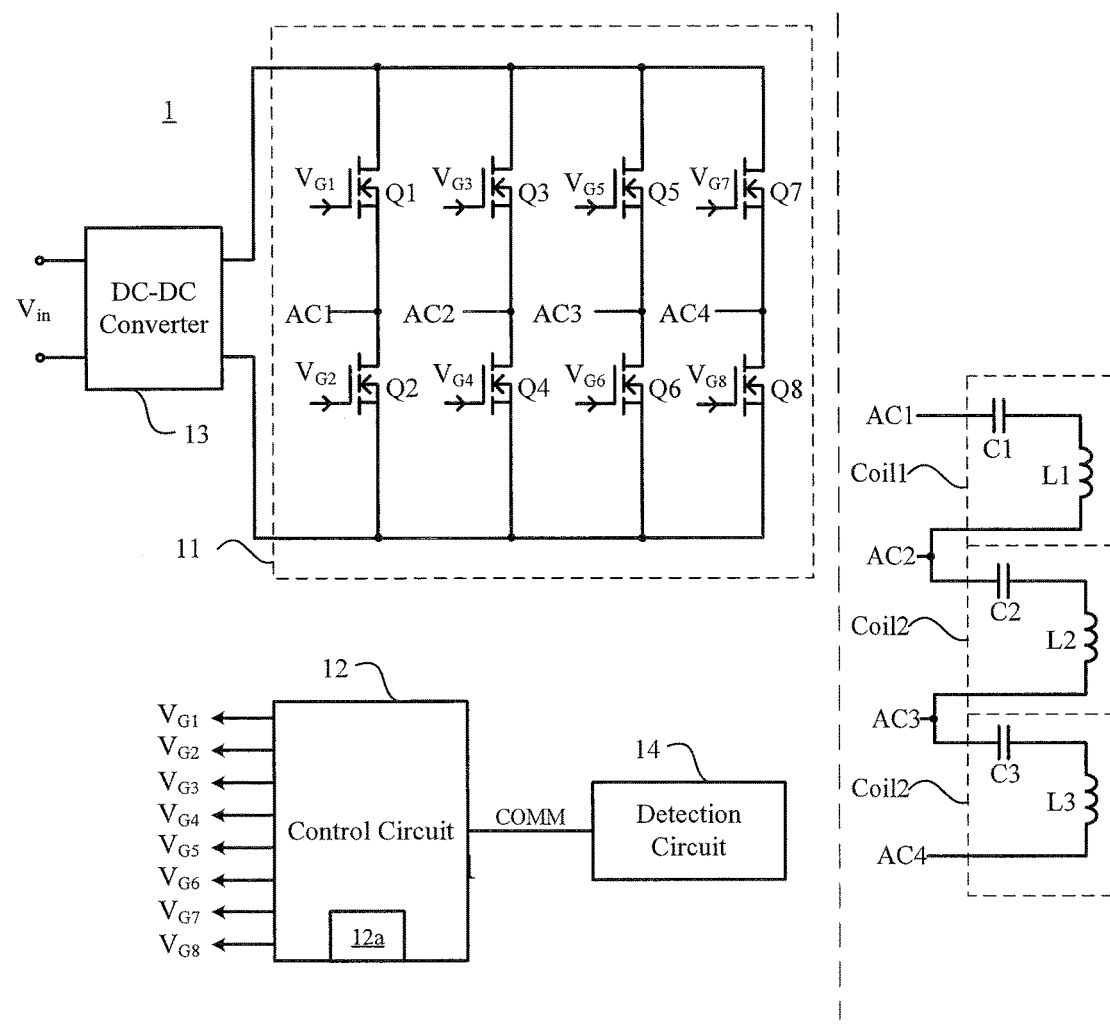
FIG. 1 is a schematic diagram of an example wireless power transmitter according to an embodiment of the present disclosure.

FIG. 1 is a schematic diagram of an example wireless power transmitter according to an embodiment of the present disclosure. As shown in FIG. 1, the wireless power transmitter according to one embodiment of the present disclosure includes N transmitter-side coupling circuits Coil1-Coil3 and a driving circuit 1, where N is an integer larger than or equal to 2, and is equal to 3 in the example shown in FIG. 1.

Specifically, the transmitter-side coupling circuits Coil1-Coil3 include transmitting coils L1-L3 which are coupled with coils of power receivers in a non-contact manner to supply electric energy. The transmitter-side coupling circuits Coil1-Coil3 is coupled with the wireless power receiver by electromagnetic induction, which may be a transmitter-side coupling circuit under a Qi standard, or is coupled with the wireless receiver by magnetic resonance, which may be a transmitter-side coupling circuit under a standard issued by A4WP.

Transmitter capacitors C1-C3 may be included in the transmitter-side coupling circuit to be connected in series or in parallel with the transmitting coils L1-L3, so as to increase efficiency of the transmitter-side coupling circuit. Obviously, one skilled in the art can understand that in some cases, distributed capacitance (for example, among wires of the transmitting coil) of the circuit may be used as the transmitter capacitor so that an additional capacitor can be omitted in the circuit.

The driving circuit 1 is configured to drive the transmitter-side coupling circuits Coil1-Coil3 to supply electric energy independently, alternately or simultaneously, and to further drive loads, i.e. wireless power receivers, of the transmitter-side coupling circuits Coil1-Coil3.

The driving circuit 1 includes an inverting circuit 11 and a control circuit 12, and preferably, includes a DC-DC converter 13 being electrically coupled to input terminals of the inverting circuit 11.

Here, the inverting circuit 11 includes N+1 half-bridge circuits which are connected in parallel at input terminals, wherein each of the N+1 half-bridge circuits has an output terminal, and the output terminal of an i-th half-bridge circuit and the output terminal of an (i+1)-th half-bridge circuit are coupled with an i-th transmitter-side coupling circuit, where i=1, 2, . . . , N. Each half-bridge circuit includes a first switch and a second switch which are connected in series between two input terminals. Specifically, referring to FIG. 1, the inverting circuit 11 includes 4 half-bridge circuits which are connected in parallel with each other between two input terminals and have output terminals AC1-AC4 respectively. The output terminals AC1 and AC2 are coupled to the input terminals of the transmitter-side coupling circuit Coil1, which is a first transmitter-side coupling circuit. The output terminals AC2 and AC3 are coupled to the input terminals of the transmitter-side coupling circuit Coil2, which is a second transmitter-side coupling circuit. The output terminals AC3 and AC4 are coupled to the input terminals of the transmitter-side coupling circuit Coil3, which is a third transmitter-side coupling circuit. In the inverting circuit 11 as shown in FIG. 1, the first switches of the four half-bridge circuits are the switches Q1, Q3, Q5 and Q7 which are connected between a first input terminal and the output terminals, the second switches of the four half-bridge circuits are the switches Q2, Q4, Q6 and Q8 which are connected between the second input terminal and the output terminals.

Thus, the i-th half-bridge circuit and the (i+1)-th half-bridge circuit constitute a full-bridge circuit for supplying an AC current to the i-th transmitter-side coupling circuit.

It should be understood that the half-bridge circuits of the inverting circuit 11 may be integrated into one integrated circuit chip, or may be a plurality of integrated circuit chips, each of which includes at least one half-bridge circuit as a module and all of which are connected with each other, or may be formed from a plurality of discrete components. If being formed by integrated circuit chips each of which includes one or more half-bridge circuits, the inverting circuit 11 can be easily extended in view of the number N of the transmitter-side coupling circuits which will be driven.

The control circuit 12 is configured to control on and off states of switches Q1-Q8 in the N+1 half-bridge circuits so that the transmitter-side coupling circuits Coil1-Coil3 transfer electric energy simultaneously, alternately, or independently.

Specifically, the control circuit 12 may drive only one transmitter-side coupling circuit each time to transfer electric energy, or all of the transmitter-side coupling circuits simultaneously to transfer electric energy. In the embodiment according to the present disclosure, the control circuit 12 may have one of the above functions, or have two or more of the above functions, which can be selected by an operating mode signal from a configuration interface of the control circuit 12. For example, the control circuit 12 may have a configuration interface 12a, which is, for example, an I2C interface. The control circuit 12 may receive a driving mode which is set by a user from the configuration interface 12a, and operate in the selected driving mode to drive the inverting circuit 11. Meanwhile, the control circuit 12 may also drive a specific one of the transmitter-side coupling circuits to transfer electric energy independently in accordance with a clock signal, which may be set from the configuration interface. Thus, the driving circuit have the beneficial effect of convenience and availability, and can be used in various applications.

Figure 2:
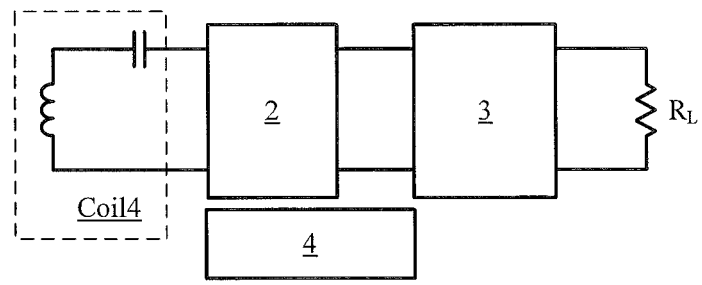
FIG. 2 is a schematic diagram of an example wireless power receiver according to an embodiment of the present disclosure.

FIG. 2 is a schematic diagram of an example wireless power receiver according to an embodiment of the present disclosure. As shown in FIG. 2, the wireless power receiver includes a receiver-side coupling circuit Coil4, a rectifier circuit 2, a DC-DC converter 3, and a communication circuit 4. The receiver-side coupling circuit Coil4 corresponds to the transmitter-side coupling circuit to receive electric energy by electromagnetic induction or by magnetic resonance. The rectifier circuit 2 is configured to rectify the received AC current to generate a DC current. The DC-DC converter 3 may adjust an output voltage or current in view of the status of the load. The communication circuit 4 is configured to communicate with the wireless power transmitter and feed back information about the wireless power receiver, including information about whether the wireless power receiver needs to be charged or not, or information about whether a load of the wireless power receiver has been changed or not. The communication circuit 4 may introduce fluctuation in the current/voltage of the transmitter-side coupling circuit by changing the load of the wireless power receiver to feed back the information. In such case, the communication circuit 4 may have a circuit which is connected in parallel with the load and have a controller for the circuit. Meanwhile, the communication circuit 4 may also feed back the above information by a communication link under a short-range wireless communication protocol, such as Bluetooth protocol or infrared communication protocol. In such case, the communication circuit 4 is a wireless communication module under the short-range wireless communication protocol.

Figure 3:
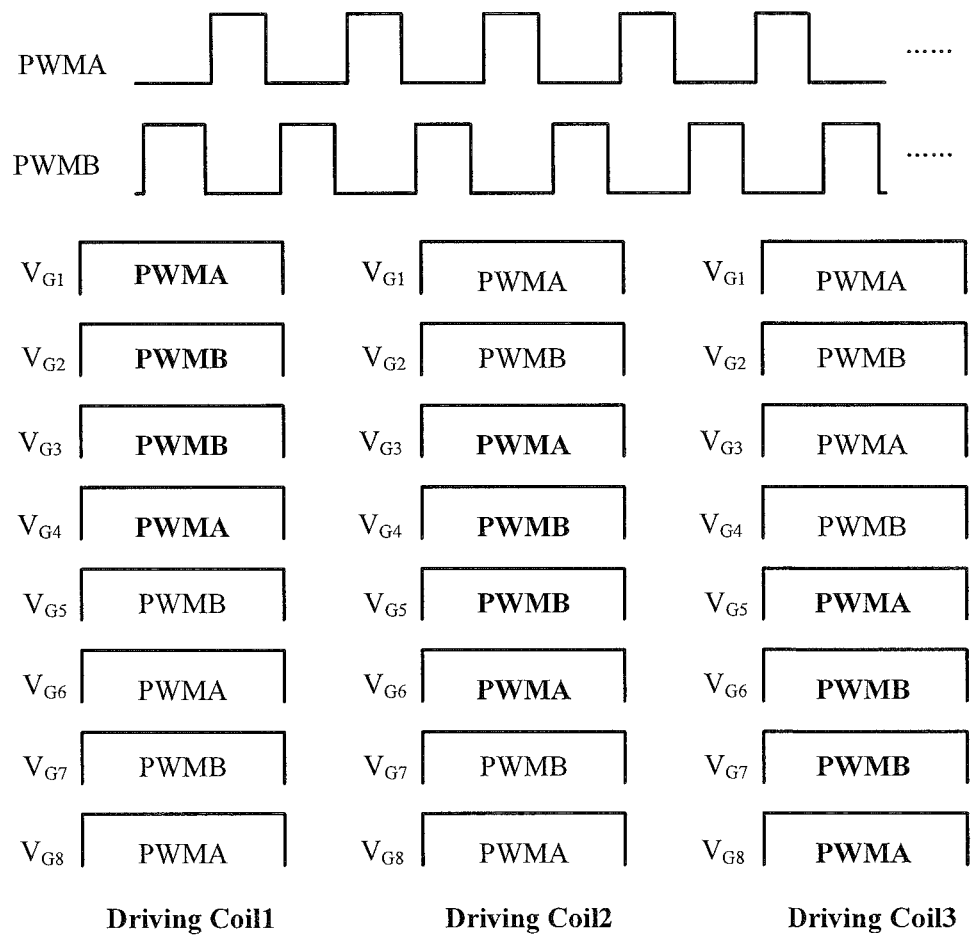
FIG. 3 is a waveform diagram showing driving signals of switches of an example wireless power transmitter according to an embodiment of the present disclosure, when driving a transmitter-side coupling circuit.

FIG. 3 is a waveform diagram showing driving signals of switches of an example wireless power transmitter according to an embodiment of the present disclosure. In a case that the control circuit 12 drives one transmitter-side coupling circuit each time to transfer electric energy, the driving signals for the switches are shown in FIG. 3. The first pulse-width modulation signal (PWM) PWMA and the second pulse-width modulation signal PWMB are complementary ones, with or without a dead zone. In one embodiment according to the present disclosure, the dead zone is a delay time after the pulse-width modulation signals turn off the first switch of the half-bridge circuit and before the pulse-width modulation signals turn on the second switch of the half-bridge circuit, or a delay time after the pulse-width modulation signals turn off the second switch of the half-bridge circuit and before the pulse-width modulation signals turn on the first switch of the half-bridge circuit. So that the power devices are protected from damage. In a case that two different pulse-width modulation signals are used to drive the first switch and the second switch independently, there is a time period during which the two pulse-width modulation signals turn off the switches, for example, at a low level. The time period is referred to as the dead zone. In one embodiment according to the present disclosure, the switches Q1-Q8 are controlled by the control signals $V_{G1}$-$V_{G8}$. It should be understood that the control signals are voltages between a control terminal of the switch and one terminal of the switch having a relatively low value.

Thus, in a case that the first transmitter-side coupling circuit is to be driven, the control signals $V_{G1}$ and $V_{G4}$ of the switches Q1 and Q4 are the first pulse-width modulation signal PWMA, and the control signals $V_{G2}$ and $V_{G3}$ of the switches Q2 and Q3 are the second pulse-width modulation signal PWMB. The four switches Q1-Q4 from the first half-bridge circuit and the second half-bridge circuit constitute a full-bridge circuit, which is an inverting circuit for converting a DC current at the input terminals into an AC current and supplying the AC current to the first transmitter-side coupling circuit at the output terminals AC1 and AC2, so as to drive the first transmitter-side coupling circuit to transfer electric energy. Meanwhile, the first switches Q5 and Q7 of the third half-bridge circuit and the fourth half-bridge circuit, which are connected in parallel with each other, are driven by the second pulse-width modulation signal PWMB, and the second switches Q6 and Q8 of the third half-bridge circuit and the fourth half-bridge circuit are driven by the first pulse-width modulation signal PWMA. That is, the first switches of the third half-bridge circuit and the fourth half-bridge circuit are turned on and off in a manner synchronized with the first switch of the second half-bridge circuit, and the second switches of the third half-bridge circuit and the fourth half-bridge circuit are turned on and off in a manner synchronized with the second switch of the second half-bridge circuit. Thus, the circuit consisting of the second half-bridge circuit and the third half-bridge circuit does not output an AC current, and the circuit consisting of the third half-bridge circuit and the fourth half-bridge circuit does not output an AC current. Thus, the control circuit 12 controls the inverting circuit 11 to output an AC current to the first transmitter-side coupling circuit at the output terminals AC1 and AC2, so as to drive the first transmitter-side coupling circuit to transfer electric energy.

Thus, in a case that the second transmitter-side coupling circuit is to be driven, the control signals $V_{G3}$ and $V_{G6}$ of the switches Q3 and Q6 are the first pulse-width modulation signal PWMA, and the control signals $V_{G4}$ and $V_{G5}$ of the switches Q4 and Q5 are the second pulse-width modulation signal PWMB. The four switches Q3-Q6 from the second half-bridge circuit and the third half-bridge circuit constitute a full-bridge circuit, which is an inverting circuit for converting a DC current at the input terminals into an AC current and supplying the AC current to the second transmitter-side coupling circuit at the output terminals AC2 and AC3, so as to drive the second transmitter-side coupling circuit to transfer electric energy. Meanwhile, the first switch Q1 of the first half-bridge circuit is controlled by the first pulse-width modulation signal PWMA, and the second switch Q2 of the first half-bridge circuit is controlled by the second pulse-width modulation signal PWMB, so that the first switch of the first half-bridge circuit is turned on and off in a manner synchronized with the first switch of the second half-bridge circuit, and the second switch of the first half-bridge circuit is turned on and off in a manner synchronized with the second switch of the second half-bridge circuit. The circuit consisting of the first half-bridge circuit and the second half-bridge circuit does not output an AC current. Similarly, the first switch Q7 of the fourth half-bridge circuit is controlled by the second pulse-width modulation signal PWMB, and the second switch Q8 of the fourth half-bridge circuit is controlled by the first pulse-width modulation signal PWMA, so that the first switch of the fourth half-bridge circuit is turned on and off in a manner synchronized with the first switch of the third half-bridge circuit, and the second switch of the fourth half-bridge circuit is turned on and off in a manner synchronized with the second switch of the third half-bridge circuit. The circuit consisting of the third half-bridge circuit and the fourth half-bridge circuit does not output an AC current. Thus, the control circuit 12 controls the inverting circuit 11 to output an AC current to the second transmitter-side coupling circuit at the output terminals AC2 and AC3, so as to drive the second transmitter-side coupling circuit to transfer electric energy.

Thus, in a case that the third transmitter-side coupling circuit is to be driven, the control signals $V_{G5}$ and $V_{G8}$ of the switches Q5 and Q8 are the first pulse-width modulation signal PWMA, and the control signals $V_{G6}$ and $V_{G7}$ of the switches Q6 and Q7 are the second pulse-width modulation signal PWMB. The four switches Q5-Q8 from the third half-bridge circuit and the fourth half-bridge circuit constitute a full-bridge circuit, which is an inverting circuit for converting a DC current at the input terminals into an AC current and supplying the AC current to the third transmitter-side coupling circuit at the output terminals AC3 and AC4, so as to drive the third transmitter-side coupling circuit to transfer electric energy. Meanwhile, the first switches Q1 and Q3 of the first half-bridge circuit and the second half-bridge circuit, which are connected in parallel with each other, are driven by the first pulse-width modulation signal PWMA, and the second switches Q2 and Q4 of the first half-bridge circuit and the second half-bridge circuit are driven by the second pulse-width modulation signal PWMB. That is, the first switches of the first half-bridge circuit and the second half-bridge circuit are turned on and off in a manner synchronized with the first switch of the third half-bridge circuit, and the second switches of the first half-bridge circuit and the second half-bridge circuit are turned on and off in a manner synchronized with the second switch of the third half-bridge circuit. Thus, the circuit consisting of the first half-bridge circuit and the second half-bridge circuit does not output an AC current, and the circuit consisting of the second half-bridge circuit and the third half-bridge circuit does not output an AC current. Thus, the control circuit 12 controls the inverting circuit 11 to output an AC current to the third transmitter-side coupling circuit at the output terminals AC3 and AC4, so as to drive the third transmitter-side coupling circuit to transfer electric energy.

Thus, the switches of the inverting circuit 11 can be controlled to be turned on and off by different pulse-width modulation signals, so that only one transmitter-side coupling circuit transfers electric energy each time. The control circuit 12 can drive a plurality of transmitter-side coupling circuits to operate alternately in a predetermined mode to supply electric energy to a plurality of loads in a wireless manner, or drive a specific one of the plurality of transmitter-side coupling circuits to operate according to user's setting, or keep a specific one of the plurality of transmitter-side coupling circuits in a standby state.

In the present disclosure, N+1 half-bridge circuits constitute N full-bridge circuits by reusing the half-bridge circuits, so as to drive a plurality of coils for wirelessly charging a plurality of loads.

As mentioned above, the driving circuit 1 preferably includes a DC-DC converter 13 which is connected between the input terminals of the power supply and the input terminals of the inverting circuit. An input voltage of the inverting circuit can be adjusted in accordance with the status of the load. It ensures that the wireless power supply operates at optimal efficiency, or at a stable output voltage.

Moreover, the wireless power transmitter according to one embodiment of the present disclosure can operate in sequence or in a time-division mode. In both cases, one transmitter-side coupling circuit is driven to transfer electric energy each time, so that a plurality of transmitter-side coupling circuits transfers electric energy alternately. The difference between two modes is as follows. In the sequence mode, the control circuit 12 controls the inverting circuit 11 to steadily supply electric energy to one transmitter-side coupling circuit which is coupled to a load which needs electric energy, until the load does not need electric energy or is disconnected, and then to next one transmitter-side coupling circuit. However, in the time-division mode, the control circuit 12 controls the inverting circuit 11 to supply electric energy, for a predetermined time period, to each transmitter-side coupling circuit which is coupled to a load which needs electric energy.

In an embodiment according to the present disclosure, the wireless power transmitter further includes a detection circuit 14 which detects whether the transmitter-side coupling circuit which is active in a current cycle is coupled to a load which needs electric energy, or not. Specifically, the detection circuit 14 may be a current/voltage detection circuit for a transmitter-side coupling circuit, in a case that the fluctuation is introduced in the wireless power receiver for the purpose of communication. The detection circuit 14 may be a communication module, in a case that the wireless power receiver communicates with the wireless power transmitter under a short-range wireless communication protocol, such as Bluetooth. The wireless transmitter detects whether a transmitter-side coupling circuit is coupled to or connected with a wireless power receiver by driving the transmitter-side coupling circuit to operate for one cycle. In a case that the transmitter-side coupling circuit which is active in the current cycle is coupled to a wireless power receiver, the wireless power receiver feeds back information periodically and steadily to the wireless power transmitter, when the wireless power receiver establishes electromagnetic coupling with the wireless power transmitter and needs electric energy. At least one feedback signal is transmitted in each cycle. Due to the fact that only one transmitter-side coupling circuit operates in each cycle, the detection circuit 14 can determine which one of the transmitter-side coupling circuits is coupled to a wireless power receiver when receiving the respective one feedback signal.

Figure 4:
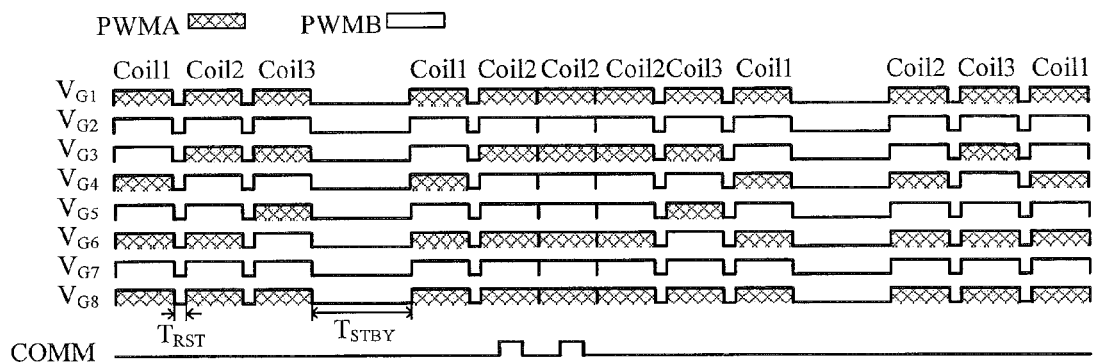
FIG. 4 is a waveform diagram of an example wireless power transmitter according to an embodiment of the present disclosure, when operated in a sequence mode.

FIG. 4 is a waveform diagram of an example wireless power transmitter according to an embodiment of the present disclosure, when operated in a sequence mode. As shown in FIG. 4, the control circuit 12 controls the inverting circuit 11 to drive the first transmitter-side coupling circuit Coil1 to operate. In such case, the detection circuit 14 does not receive the feedback signal. After the current cycle, the control circuit 12 changes the control signal so that the inverting circuit 11 switches to drive the second transmitter-side coupling circuit Coil2 to operate.

Preferably, the control circuit controls the switches of the inverting circuit to be turned off, until a predetermined reset time $T_{RST}$ elapses before switching the transmitter-side coupling circuit which is active. Thus, there is sufficient time for an input voltage to be reset when the input voltage needs to be adjusted, while power devices are protected from damage.

In such case, the detection circuit 14 cannot receive a feedback signal. Then, the control circuit 12 controls the inverting circuit 11 to be switched to drive the third transmitter-side coupling circuit Coil3 to operate. In such case, the detection circuit 14 does not receive the feedback signal. Thus, none of the transmitter-side coupling circuits is coupled to the wireless power receivers in such case. In such case, the wireless power transmitter can be controlled in a standby state for a predetermined time period $T_{STBY}$ to reduce power consumption.

After the standby state, the control circuit 12 starts a new cycle. Firstly, the control circuit 12 detects whether the first transmitter-side coupling circuit Coil1 is coupled to a wireless power receiver, or not. In next one cycle, the control circuit 12 switches to detect whether the second transmitter-side coupling circuit Coil2 is coupled to a wireless power receiver, or not. In this cycle, the detection circuit 14 receives a feedback signal from the wireless power receiver. Thus, the control circuit 12 controls the inverting circuit 11 to drive the transmitter-side coupling circuit Coil2 which is active in this cycle to transfer electric energy steadily, until the detection circuit detects that the load is disconnected or does not need electric energy. That is, the inverting circuit 11 drives the second transmitter-side coupling circuit Coil2 to supply electric energy steadily, until the detection circuit 14 does not receive the feedback signal in the third one of the successive cycles. In next one cycle, the control circuit 12 controls in sequence the inverting circuit 11 to drive the third transmitter-side coupling circuit Coil3 to operate, so as to detect whether it is coupled to a wireless power receiver or not. In a case that no feedback signal is received, the control circuit 12 controls in sequence the inverting circuit 11 to drive the first transmitter-side coupling circuit Coil1 to operate, so as to detect whether it is coupled to a wireless power receiver or not. In a case that no feedback signal is received again, the control circuit 12 determines that none of the transmitter-side coupling circuits is coupled to a load which needs electric energy. Thus, the control circuit 12 controls the wireless power transmitter to standby again for a predetermined timer period. After the standby state, the control circuit 12 starts next one cycle again. Thus, a plurality of transmitter-side coupling circuits can be driven in sequence to supply electric energy to a plurality of loads in a time period.

Moreover, in the sequence mode, some of the transmitter-side coupling circuits may be enabled through a configuration interface, so that the others of the transmitter-side coupling circuits are disabled. Specifically, the configuration interface is configured to receive an enable signal for enabling some of the transmitter-side coupling circuits. The control circuit 12 may drive one of enabled transmitter-side coupling circuits in each cycle to supply electric energy in accordance with the enable signal, but drive none of disabled transmitter-side coupling circuits in any case. Obviously, the working sequence and the control manner will be the same as those in FIG. 4, if all of the transmitter-side coupling circuits are enabled.

The detection circuit 14 detects whether the enabled transmitter-side coupling circuit which is active in a current cycle is electrically coupled to a load which needs electric energy, or not.

In a case that the detection circuit 14 determines that the enabled transmitter-side coupling circuit which is active in the current cycle is electrically coupled to the load which needs electric energy, the control circuit 12 controls the inverting circuit 11 to drive the enabled transmitter-side coupling circuit which is active in the current cycle to transfer electric energy continuously, until the detection circuit detects that the load is disconnected or does not need electric energy, and to drive next one enabled transmitter-side coupling circuit in sequence to transfer electric energy in next one cycle.

Thus, in the detection and driving process, the control circuit 12 omits one or more transmitter-side coupling circuits which is not enabled, namely disabled. That is, the transmitter-side coupling circuits which operates in sequence are limited to those enabled transmitter-side coupling circuits. The working sequence and the control manner will be similar with those in FIG. 4, for switching between all of the enabled transmitter-side coupling circuits.

For example, the enable signal may be used for setting the first transmitter-side coupling circuit Coil1 and the second transmitter-side coupling circuit Coil2 to be an enabled state. That is, the third transmitter-side coupling circuit Coil3 is disabled. When detecting a load, the control circuit 12 controls the inverting circuit 11 to drive the first transmitter-side coupling circuit Coil1 to supply electric energy in a first cycle, while the detection circuit 14 detects the load. If there is no a load being detected, the control circuit 12 controls the inverting circuit 11 to drive the second transmitter-side coupling circuit Coil2 to supply electric energy in a second cycle, while the detection circuit 14 detects the load. If there is no a load being detected in the second cycle, the control circuit 12 determines that none of the enabled transmitter-side coupling circuit is coupled to a load which needs electric energy. The control circuit 12 controls the wireless power transmitter to standby, but not switch to the third transmitter-side coupling circuit Coil3, in next one cycle. The third transmitter-side coupling circuit Coil3 will neither have an opportunity to transfer electric energy, nor be provided with a cycle for detecting whether it is coupled to a load or not. Thus, the third transmitter-side coupling circuit Coil3 is disabled in the sequence mode.

Thus, the driving circuit can still be used even in a case the number of the transmitter-side coupling circuits varies, which improves adaptability of the driving circuit.

Figure 5:
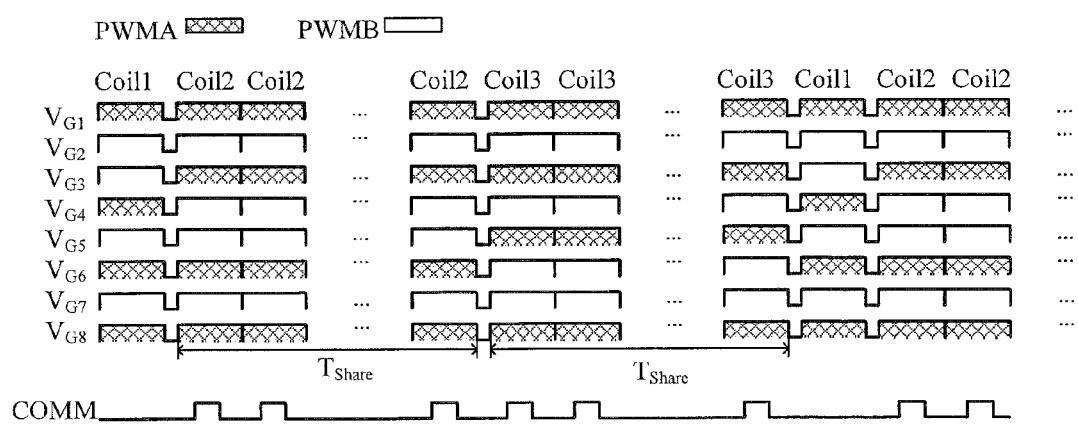
FIG. 5 is a waveform diagram of an example wireless power transmitter according to an embodiment of the present disclosure, when operated in a time-division mode.

FIG. 5 is a waveform diagram of an example wireless power transmitter according to an embodiment of the present disclosure, when operated in a time-division mode. As shown in FIG. 5, the control circuit 12 controls the inverting circuit 11 to drive the first transmitter-side coupling circuit Coil1 to operate. In such case, the detection circuit 14 does not receive the feedback signal. After the current cycle, the control circuit 12 changes the control signal so that the inverting circuit 11 switches to drive the second transmitter-side coupling circuit Coil2 to operate. In this cycle, the detection circuit 14 receives a feedback signal, which indicates that the second transmitter-side coupling circuit Coil2 is electrically coupled to a load which needs electric energy. Thus, the control circuit 12 controls the inverting circuit 11 to drive the second transmitter-side coupling circuit Coil2 to operate for a predetermined number of cycles. In next one cycle after the predetermined number of cycles, the control circuit 12 controls in sequence the inverting circuit 11 to drive next one transmitter-side coupling circuit (i.e. the third transmitter-side coupling circuit Coil3) to transfer electric energy. In this cycle, the detection circuit 14 receives a feedback signal. Thus, the control circuit controls the inverting circuit 11 to drive the third transmitter-side coupling circuit Coil3 to operate for a predetermined number of cycles. In next one cycle after the predetermined number of cycles, the control circuit 12 controls in sequence the inverting circuit 11 to drive the first transmitter-side coupling circuit Coil1 to operate, so as to detect whether it is coupled to a load which needs electric energy. In this cycle, the detection circuit 14 does not receive a feedback signal. Thus, in next one cycle, the control circuit 12 controls the inverting circuit 11 to switch to the second transmitter-side coupling circuit Coil2. In a case that a feedback signal is received, the second transmitter-side coupling circuit Coil2 is driven to operate for a predetermined number of cycles. The timing sequence is thus repeated.

Thus, a plurality of transmitter-side coupling circuits can be driven in sequence to supply electric energy to a plurality of loads in a time period.

Moreover, in the time-division mode, some of the transmitter-side coupling circuits may be enabled through a configuration interface, so that the others of the transmitter-side coupling circuits are disabled. Specifically, the configuration interface is configured to receive an enable signal for enabling some of the transmitter-side coupling circuits. The control circuit 12 may drive one of enabled transmitter-side coupling circuits in each cycle to supply electric energy in accordance with the enable signal, but drive none of disabled transmitter-side coupling circuits in any case. Obviously, the working sequence and the control manner will be the same as those in FIG. 4, if all of the transmitter-side coupling circuits are enabled.

The detection circuit 14 detects whether the enabled transmitter-side coupling circuit which is active in a current cycle is electrically coupled to a load which needs electric energy, or not.

In a case that the detection circuit 14 determines that the enabled transmitter-side coupling circuit which is active in the current cycle is electrically coupled to the load which needs electric energy, the control circuit 12 controls the inverting circuit 11 to drive the enabled transmitter-side coupling circuit which is active in the current cycle to transfer electric energy continuously until a predetermined number of cycles elapse, and to drive next one enabled transmitter-side coupling circuit in sequence to transfer electric energy in next one cycle.

Thus, in the detection and driving process, the control circuit 12 omits one or more transmitter-side coupling circuits which is not enabled, namely disabled. That is, the transmitter-side coupling circuits which operates in sequence are limited to those enabled transmitter-side coupling circuits. The working sequence and the control manner will be the same as those in FIG. 5, for switching between all of the enabled transmitter-side coupling circuits.

For example, the enable signal may be used for setting the first transmitter-side coupling circuit Coil1 and the second transmitter-side coupling circuit Coil2 to be in an enable state. That is, the third transmitter-side coupling circuit Coil3 is disabled. When detecting a load, the control circuit 12 controls the inverting circuit 11 to drive the first transmitter-side coupling circuit Coil1 to supply electric energy in a first cycle, while the detection circuit 14 detects the load. When there is no a load being detected, the control circuit 12 controls the inverting circuit 11 to drive the second transmitter-side coupling circuit Coil2 to supply electric energy in a second cycle, while the detection circuit 14 detects the load. If there is no a load being detected in the second cycle, the control circuit 12 determines that none of the enabled transmitter-side coupling circuit is coupled to a load which needs electric energy. The control circuit 12 controls the wireless power transmitter to standby, but not switch to the third transmitter-side coupling circuit Coil3 in next one cycle. The third transmitter-side coupling circuit Coil3 will neither have an opportunity to transfer electric energy, nor be provided with a cycle for detecting whether it is coupled to a load or not. Thus, the third transmitter-side coupling circuit Coil3 is disabled in the sequence mode.

Thus, the driving circuit can still be used even in a case the number of the transmitter-side coupling circuits varies, which improves adaptability of the driving circuit.

Figure 6:
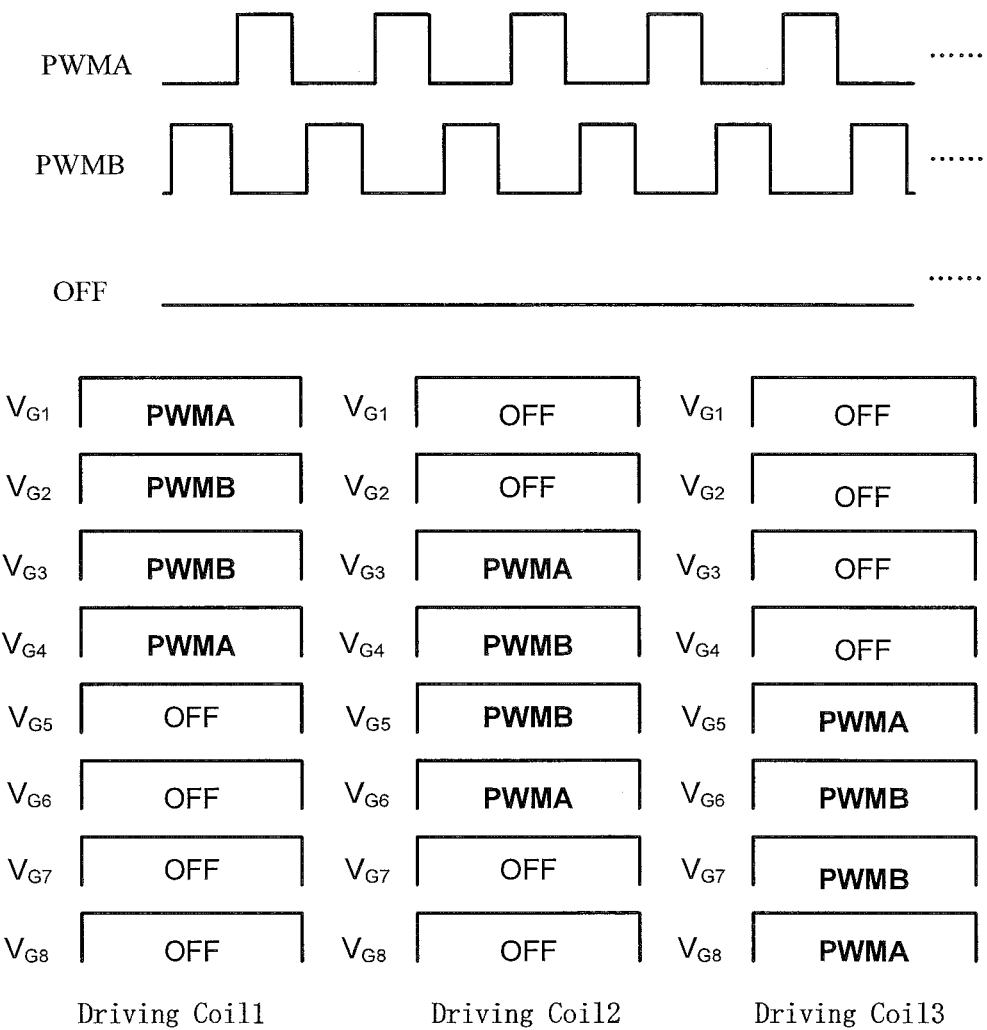
FIG. 6 is a waveform diagram showing driving signals of switches of another example wireless power transmitter according to an embodiment of the present disclosure, when driving a transmitter-side coupling circuit.

In another embodiment according to the present disclosure, the switches of the inverting circuit may be controlled in different control modes so that one transmitter-side coupling circuit is driven each time. FIG. 6 is a waveform diagram showing driving signals of switches of an example wireless power transmitter according to another embodiment of the present disclosure. As shown in FIG. 6, the first pulse-width modulation signal PWMA and the second pulse-width modulation signal PWMB are complementary ones, with or without a dead zone. Different from the above embodiment, the switching control signals include off signal OFF which is used for turning off the switches.

Thus, in a case that the first transmitter-side coupling circuit is to be driven, the driving signals $V_{G1}$ and $V_{G4}$ of the switches Q1 and Q4 are the first pulse-width modulation signal PWMA, and the driving signals $V_{G2}$ and $V_{G3}$ of the switches Q2 and Q3 are the second pulse-width modulation signal PWMB. The four switches Q1-Q4 from the first half-bridge circuit and the second half-bridge circuit constitute a full-bridge circuit, which is an inverting circuit for converting a DC current at the input terminals into an AC current and supplying the AC current to the first transmitter-side coupling circuit at the output terminals AC1 and AC2, so as to drive the first transmitter-side coupling circuit to transfer electric energy. Meanwhile, the switches Q5-Q8 of the third half-bridge circuit and the fourth half-bridge circuit which are connected in parallel with each other are controlled to be off by the off signal OFF. Thus, the circuit consisting of the second half-bridge circuit and the third half-bridge circuit does not output an AC current, and the circuit consisting of the third half-bridge circuit and the fourth half-bridge circuit does not output an AC current. Thus, the control circuit 12 controls the inverting circuit 11 to output an AC current to the first transmitter-side coupling circuit at the output terminals AC1 and AC2, so as to drive the first transmitter-side coupling circuit to transfer electric energy.

Similarly, in a case that the second transmitter-side coupling circuit is to be driven, the control signals $V_{G3}$ and $V_{G6}$ of the switches Q3 and Q6 are the first pulse-width modulation signal PWMA, and the control signals $V_{G4}$ and $V_{G5}$ of the switches Q4 and Q5 are the second pulse-width modulation signal PWMB. The four switches Q3-Q6 from the second half-bridge circuit and the third half-bridge circuit constitute a full-bridge circuit, which is an inverting circuit for converting a DC current at the input terminals into an AC current and supplying the AC current to the second transmitter-side coupling circuit at the output terminals AC2 and AC3, so as to drive the second transmitter-side coupling circuit to transfer electric energy. Meanwhile, other switches Q1, Q2, Q7, Q8 of the inverting circuit are turned off. Thus, the circuit consisting of the first half-bridge circuit and the second half-bridge circuit does not output an AC current, and the circuit consisting of the third half-bridge circuit and the fourth half-bridge circuit does not output an AC current. Thus, the control circuit 12 controls the inverting circuit 11 to output an AC current to the second transmitter-side coupling circuit at the output terminals AC2 and AC3, so as to drive the second transmitter-side coupling circuit to transfer electric energy.

Thus, in a case that the third transmitter-side coupling circuit is to be driven, the driving signals $V_{G5}$ and $V_{G8}$ of the switches Q5 and Q8 are the first pulse-width modulation signal PWMA, and the driving signals $V_{G6}$ and $V_{G7}$ of the switches Q6 and Q7 are the second pulse-width modulation signal PWMB. The four switches Q5-Q8 from the third half-bridge circuit and the fourth half-bridge circuit constitute a full-bridge circuit, which is an inverting circuit for converting a DC current at the input terminals into an AC current and supplying the AC current to the third transmitter-side coupling circuit at the output terminals AC3 and AC4, so as to drive the third transmitter-side coupling circuit to transfer electric energy. Meanwhile, the switches Q1-Q4 are controlled by the off signal OFF. Thus, the circuit consisting of the first half-bridge circuit and the second half-bridge circuit does not output an AC current, and the circuit consisting of the second half-bridge circuit and the third half-bridge circuit does not output an AC current. Thus, the control circuit 12 controls the inverting circuit 11 to output an AC current to the third transmitter-side coupling circuit at the output terminals AC3 and AC4, so as to drive the third transmitter-side coupling circuit to transfer electric energy.

Thus, the switches of the inverting circuit 11 can be controlled to be turned on and off by different pulse-width modulation signals, so that only one transmitter-side coupling circuit transfers electric energy each time. The control circuit 12 can drive a plurality of transmitter-side coupling circuits to operate alternately in a predetermined mode to supply electric energy to a plurality of loads in a wireless manner, or drive a specific one of the plurality of transmitter-side coupling circuits to operate according to user's setting, or keep a specific one of the plurality of transmitter-side coupling circuits in a standby state.

Similar with the above embodiment, the wireless power transmitter according to one embodiment of the present disclosure can operate in a sequence mode or in a time-division mode. In both cases, one transmitter-side coupling circuit is driven to transfer electric energy each time.

Figure 7:
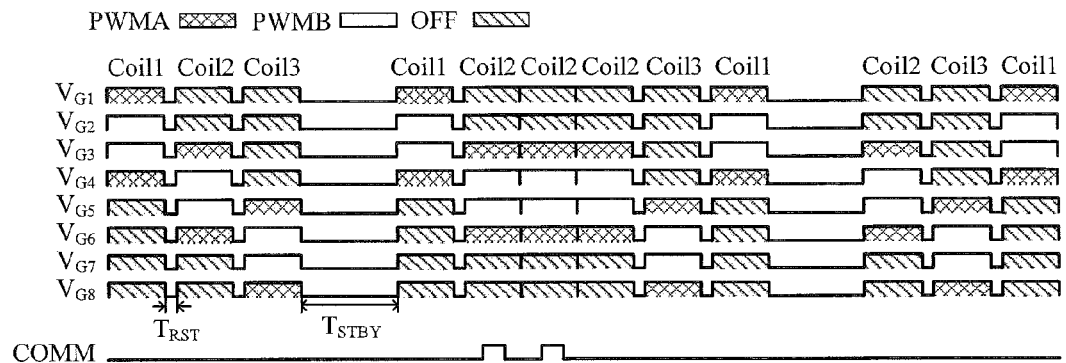
FIG. 7 is a waveform diagram of another example wireless power transmitter according to an embodiment of the present disclosure, when operated in a sequence mode.

FIG. 7 is a waveform diagram of an example wireless power transmitter according to an embodiment of the present disclosure, when operated in a sequence mode. As shown in FIG. 7, the control circuit 12 controls the inverting circuit 11 to drive the first transmitter-side coupling circuit Coil1 to operate. In such case, the detection circuit 14 does not receive the feedback signal. After the current cycle, the control circuit 12 changes the control signal so that the inverting circuit 11 switches to drive the second transmitter-side coupling circuit Coil2 to operate.

Preferably, the control circuit controls the switches of the inverting circuit to be turned off, until a predetermined reset time $T_{RST}$ elapses before switching the transmitter-side coupling circuit which is active. There is sufficient time for the input voltage to be reset, which improves efficiency.

In such case, the detection circuit 14 cannot receive a feedback signal. Then, the control circuit 12 controls the inverting circuit 11 to be switched to drive the third transmitter-side coupling circuit Coil3 to operate. In such case, the detection circuit 14 does not receive the feedback signal. Thus, none of the transmitter-side coupling circuits is coupled to the wireless power receivers in such case. In such case, the wireless power transmitter can be controlled in a standby state for a predetermined time period $T_{STBY}$ to reduce power consumption.

After the standby state, the control circuit 12 starts a new cycle. Firstly, the control circuit 12 detects whether the transmitter-side coupling circuit Coil is coupled to a wireless power receiver, or not. In next cycle, the control circuit 12 switches to detect whether the second transmitter-side coupling circuit Coil2 is coupled to a wireless power receiver, or not. In this cycle, the detection circuit 14 receives a feedback signal from the wireless power receiver. Thus, the control circuit 12 controls the inverting circuit 11 to drive the transmitter-side coupling circuit Coil2 which is active in this cycle to transfer electric energy steadily, until the detection circuit detects that the load is disconnected or does not need electric energy. That is, the inverting circuit 11 drives the second transmitter-side coupling circuit Coil2 to transfer electric energy steadily, until the detection circuit does not receive a feedback signal from the wireless power receiver in a successive third cycle. In next one cycle, the control circuit 12 controls in sequence the inverting circuit 11 to drive the third transmitter-side coupling circuit Coil3 to operate, so as to detect whether it is coupled to a wireless power receiver or not. In a case that no feedback signal is received, the control circuit 12 controls in sequence the inverting circuit 11 to drive the first transmitter-side coupling circuit Coil1 to operate, so as to detect whether it is coupled to a wireless power receiver or not. In a case that no feedback signal is received again, the control circuit 12 determines that none of the transmitter-side coupling circuits is coupled to a load which needs electric energy. Thus, the control circuit 12 controls the wireless power transmitter to standby again for a predetermined timer period. After the standby time period, the control circuit 12 starts next one cycle again. Thus, a plurality of transmitter-side coupling circuits can be driven in sequence to supply electric energy to a plurality of loads in a time period.

Figure 8:
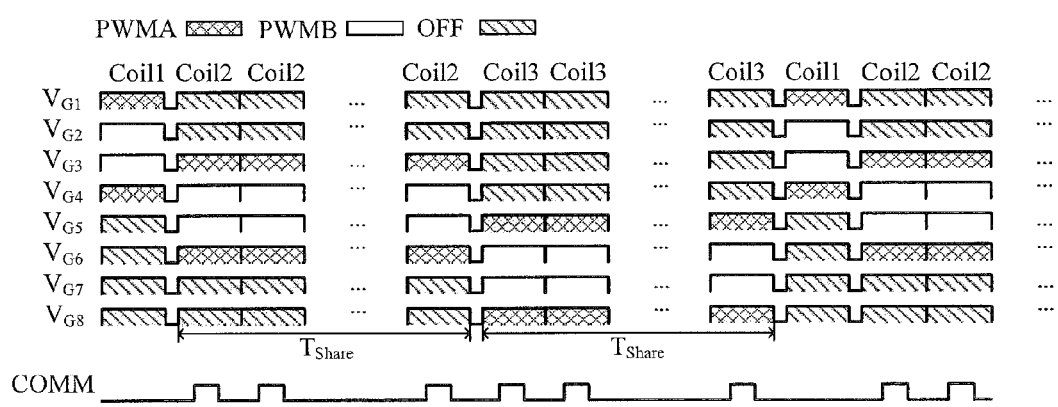
FIG. 8 is a waveform diagram of another example wireless power transmitter according to an embodiment of the present disclosure, when operated in a time-division mode.

FIG. 8 is a waveform diagram of an example wireless power transmitter according to an embodiment of the present disclosure, when operated in a time-division mode. As shown in FIG. 8, the control circuit 12 controls the inverting circuit 11 to drive the first transmitter-side coupling circuit Coil1 to operate. In such case, the detection circuit 14 does not receive the feedback signal. After the current cycle, the control circuit 12 changes the control signal so that the inverting circuit 11 switches to drive the second transmitter-side coupling circuit Coil2 to operate. In this cycle, the detection circuit 14 receives a feedback signal, which indicates that the second transmitter-side coupling circuit Coil2 is electrically coupled to a load which needs electric energy. Thus, the control circuit 12 controls the inverting circuit 11 to drive the second transmitter-side coupling circuit Coil2 to operate for a predetermined number of cycles. In next one cycle after the predetermined number of cycles, the control circuit 12 controls in sequence the inverting circuit 11 to drive next one transmitter-side coupling circuit (i.e. the third transmitter-side coupling circuit Coil3) to transfer electric energy. In this cycle, the detection circuit 14 receives a feedback signal. Thus, the control circuit 12 controls the inverting circuit 11 to drive the third transmitter-side coupling circuit Coil3 to operate for a predetermined number of cycles. In next one cycle after the predetermined number of cycles, the control circuit 12 controls in sequence the inverting circuit 11 to drive the first transmitter-side coupling circuit Coil1 to operate, so as to detect whether it is coupled to a load which needs electric energy. In this cycle, the detection circuit 14 does not receive a feedback signal. Thus, in next one cycle, the control circuit 12 controls the inverting circuit 11 to switch to the second transmitter-side coupling circuit Coil2. In a case that a feedback signal is received, the second transmitter-side coupling circuit Coil2 is driven to operate for a predetermined number of cycles. The timing sequence is thus repeated.

Thus, a plurality of transmitter-side coupling circuits can be driven in sequence to supply electric energy to a plurality of loads in a time period.

Figure 9:
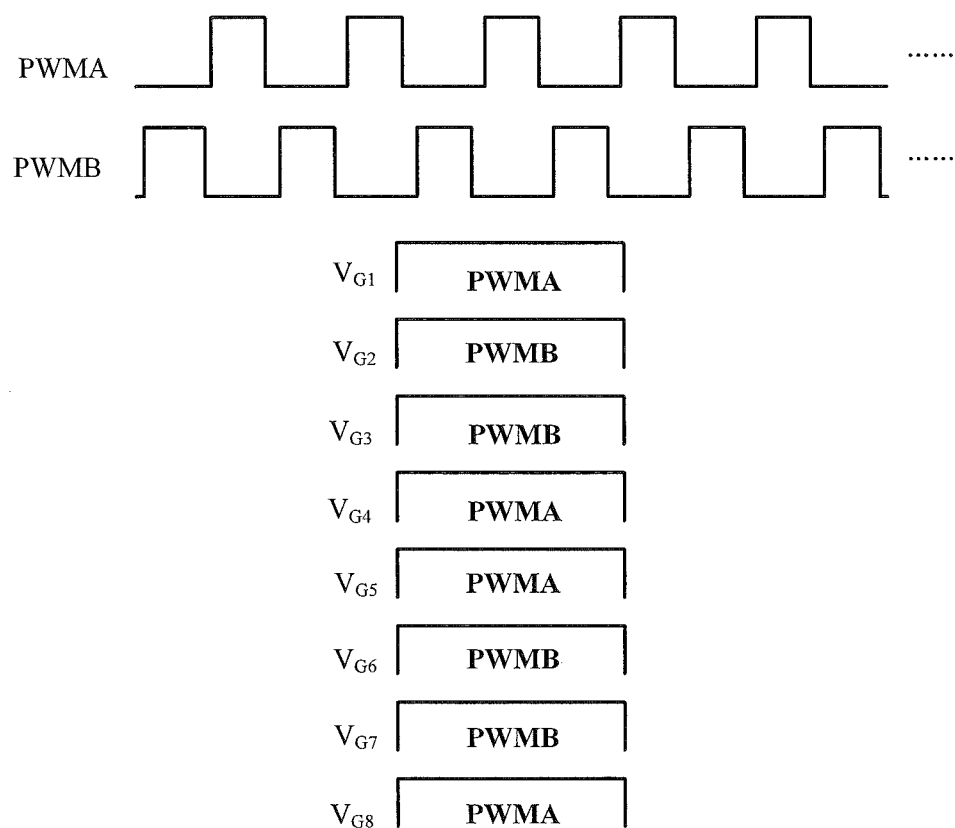
FIG. 9 is a waveform diagram showing driving signals of switches of an example wireless power transmitter according to an embodiment of the present disclosure, when driving all of the transmitter-side coupling circuits in a simultaneous mode.

In some applications, such as wireless kitchen appliances, the receiver has a plurality of coils. A plurality of transmitting coils are required to transfer electric energy simultaneously, so as to increase power. As mentioned above, in one embodiment according to the present disclosure, the switches of the inverting circuit can be controlled to drive all of the transmitter-side coupling circuits to operate simultaneously. FIG. 9 is a waveform diagram showing driving signals of switches of an example wireless power transmitter according to an embodiment of the present disclosure, when driving all of the transmitter-side coupling circuits in a simultaneous mode. As shown in FIG. 9, the first pulse-width modulation signal PWMA and the second pulse-width modulation signal PWMB are complementary ones, with or without a dead zone.

The control circuit 12 controls the first switch in the j-th half-bridge circuit and the second switch in the k-th half-bridge circuit in accordance with a first pulse-width modulation signal, and to control the second switch in the j-th half-bridge circuit and the first switch in the k-th half-bridge circuit in accordance with a second pulse-width modulation signal, to drive all of the transmitter-side coupling circuits to transfer energy simultaneously, where j is any odd number in 1 to N+1 and k is any even number in 1 to N+1. Specifically, in one embodiment according to the present disclosure, an inverting circuit consists of 4 half-bridge circuits. Control signals $V_{G1}$-$V_{G8}$ of switches Q1-Q8 are pulse-width modulation signals PWMA, PWMB, PWMB, PWMA, PWMA, PWMB, PWMB, and PWMA, respectively. Thus, all of the half-bridge circuits constitute a full-bridge inverting circuit having three output terminals, which outputs an AC current to the first transmitter-side coupling circuit at the output terminals AC1 and AC2, to the second transmitter-side coupling circuit at the output terminals AC2 and AC3, and to the third transmitter-side coupling circuit at the output terminals AC3 and AC4. The above three transmitter-side coupling circuits are driven to operate simultaneously.

It should be understood that some of the transmitter-side coupling circuits may be enabled through a configuration interface, so that the others of the transmitter-side coupling circuits are disabled, both in a sequence mode and in a time-division mode. The specific implementation is the same as that in the above embodiment, and detailed description of which is omitted.

Moreover, the present embodiment may control transmission of electric energy by a detection circuit. In an embodiment according to the present disclosure, the wireless power transmitter further includes a detection circuit 14 which detects whether a transmitter-side coupling circuit is coupled to a load which needs electric energy, or not. It is determined that none of the transmitter-side coupling circuits is coupled to a load which needs electric energy when no feedback signal has been received in a current cycle.

Figure 10:
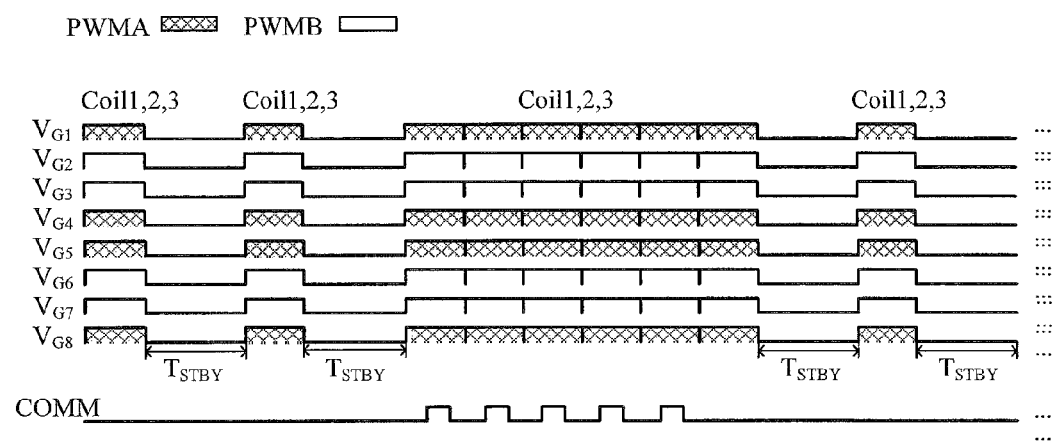
FIG. 10 is a waveform diagram of an example wireless power transmitter according to an embodiment of the present disclosure, when operated in a simultaneous mode.

FIG. 10 is a waveform diagram of an example wireless power transmitter according to an embodiment of the present disclosure, when operated in a simultaneous mode. As shown in FIG. 10, in the first cycle, the control circuit 12 controls the inverting circuit 11 to drive all of the transmitter-side coupling circuits to operate to transfer electric energy, and detects whether each of the transmitter-side coupling circuit is coupled to a load which needs electric energy. In a case that there is no load, the control circuit 12 controls the wireless power transmitter to standby for a predetermined time period $T_{STBY}$. Similarly, in a first cycle after the standby time period, there is no load being detected, which needs electric energy and is coupled to the transmitter-side coupling circuit. Thus, the control circuit 12 controls the wireless power transmitter to standby again. In a first cycle after the second standby time period, the detection circuit 14 receives a feedback signal. Thus, the control circuit 12 controls the inverting circuit 11 to drive the three transmitter-side coupling circuits to operate simultaneously. Meanwhile, the detection circuit 14 detects whether a feedback signal is received from the wireless power receiver in each cycle. In a last cycle of the successive cycles, the detection circuit 14 receives no feedback signal, which means that the load has been disconnected or does not need electric energy. Thus, the control circuit 12 stops to supply electric energy and switches to a standby state. The timing sequence is thus repeated.

Thus, a plurality of transmitter-side coupling circuits can be driven to operate simultaneously to supply electric energy to a plurality of loads in a time period.

It should be understood that a portion of a power stage and the corresponding control circuit of the DC-DC converter 13, the inverting circuit 11, the control circuit 12, and the detection circuit 14 may be formed as an integrated circuit chip so as to reduce product size.

It should be understood that one or more operation modes or their combinations may be configured in the control circuit, and may be selected by the control circuit in accordance with user settings. That is, the driving circuit according to the present disclosure may be used in different applications, by providing different driving modes with the same one circuit, in which the different driving modes can be selected in accordance with user settings through the configuration interface.

The foregoing descriptions of specific embodiments of the present disclosure have been presented, but are not intended to limit the disclosure to the precise forms disclosed. It will be readily apparent to one skilled in the art that many modifications and changes may be made in the present disclosure. Any modifications, equivalence, variations of the preferred embodiments can be made without departing from the doctrine and spirit of the present disclosure.

The invention claimed is:

1. A driving circuit for driving N transmitter-side coupling circuits at a wireless power transmitter, where N is an integer larger than or equal to 2, comprising:
    an inverting circuit comprising N+1 half-bridge circuits which are connected in parallel at input terminals, wherein each of said N+1 half-bridge circuits has an output terminal, and said output terminal of an i-th half-bridge circuit and said output terminal of an (i+1)-th half-bridge circuit are coupled with an i-th transmitter-side coupling circuit, where i=1, 2, . . . , N; and a control circuit being configured to control on and off states of switches in said N+1 half-bridge circuits so that said N transmitter-side coupling circuits transfer electric energy simultaneously, alternately, or independently, wherein said N+1 output terminals are coupled in series through said N transmitter-side coupling circuits, and each of said transmitter-side coupling circuit is coupled between corresponding two adjacent output terminals.

2. The driving circuit according to claim 1, wherein said control circuit comprises:

a configuration interface being configured to receive a driving mode of said wireless power transmitter;

wherein said control circuit is configured to control on and off states of said switches in said N+1 half-bridge circuits in accordance with said driving mode so that said N transmitter-side coupling circuits transfer electric energy simultaneously, alternately, or independently.

3. The driving circuit according to claim 2, wherein each of said N+1 half-bridge circuits comprises a first switch and a second switch;

said control circuit is configured to control said first switch in said i-th half-bridge circuit and said second switch in said (i+1)-th half-bridge circuit in accordance with a first pulse-width modulation signal, and to control said second switch in said i-th half-bridge circuit and said first switch in said (i+1)-th half-bridge circuit in accordance with a second pulse-width modulation signal, so as to drive said i-th transmitter-side coupling circuit to transfer energy;

said control circuit is further configured to control said first switches in said 1-st to said (i-1)-th half-bridge circuits to be synchronized with said first switch in said i-th half-bridge circuit, to control said second switches in said 1-st to said (i-1)-th half-bridge circuits to be synchronized with said second switch in said i-th half-bridge circuit, to control said first switches in said (i+2)-th to said (N+1)-th half-bridge circuits to be synchronized with said first switch in said (i+1)-th half-bridge circuit, and to control said second switches in said (i+2)-th to said (N+1)-th half-bridge circuits to be synchronized with said second switch in said (i+1)-th half-bridge circuit, so that said transmitter-side coupling circuits, except for said i-th transmitter-side coupling circuit, do not transfer electric energy, wherein said first pulse-width modulation signal and said second pulse-width modulation signal are complementary signals with or without a dead zone.

4. The driving circuit according to claim 3, wherein said control circuit is configured to drive one of said transmitter-side coupling circuits to transfer electric energy in each cycle; and wherein said wireless power transmitter further comprises:

a detection circuit being configured to detect whether said transmitter-side coupling circuit which is active in a current cycle is electrically coupled to a load which needs electric energy or not, wherein in a case that said detection circuit determines that said transmitter-side coupling circuit which is active in said current cycle is electrically coupled to said load which needs electric energy, said control circuit is configured to control said inverting circuit to drive said transmitter-side coupling circuit which is active in said current cycle to transfer electric energy continuously, until said detection circuit detects that said load is disconnected or does not need electric energy, and to drive next one transmitter-side coupling circuit in sequence to transfer electric energy in next one cycle.

5. The driving circuit according to claim 4, wherein said control circuit turns off said inverting circuit until a predetermined reset time elapses before switching said transmitter-side coupling circuit which is active.

6. The driving circuit according to claim 4, wherein in a case that said detection circuit detects none of said transmitter-side coupling circuits is electrically coupled to said load which needs electric energy, said control circuit controls said wireless power transmitter in a standby state for a predetermined time period.

7. The driving circuit according to claim 4, wherein said detection circuit detects said load by detecting fluctuation in said transmitter-side coupling circuits, or by receiving a signal from a communication module under a short-range wireless communication protocol.

8. The driving circuit according to claim 3, wherein said control circuit is configured to drive one of said transmitter-side coupling circuits to transfer electric energy in each cycle; and wherein said wireless power transmitter further comprises:

a detection circuit being configured to detect whether said transmitter-side coupling circuit which is active in a current cycle is electrically coupled to a load which needs electric energy or not, wherein in a case that said detection circuit determines that said transmitter-side coupling circuit which is active in said current cycle is electrically coupled to said load which needs electric energy, said control circuit is configured to control said inverting circuit to drive said transmitter-side coupling circuit which is active in said current cycle to transfer electric energy continuously until a predetermined number of cycles elapse, and to drive next one transmitter-side coupling circuit in sequence to transfer electric energy after said predetermined number of cycles elapse.

9. The driving circuit according to claim 3, wherein said configuration interface is configured to receive an enable signal for enabling one of said transmitter-side coupling circuits;

said control circuit is configured to drive an enabled transmitter-side coupling circuits to transfer electric energy in each cycle;

wherein said wireless power transmitter further comprises:

a detection circuit being configured to detect whether said enabled transmitter-side coupling circuit which is active in a current cycle is electrically coupled to a load which needs electric energy or not, wherein in a case that said detection circuit determines that said enabled transmitter-side coupling circuit which is active in said current cycle is electrically coupled to said load which needs electric energy, said control circuit is configured to control said inverting circuit to drive said enabled transmitter-side coupling circuit which is active in said current cycle to transfer electric energy continuously, until said detection circuit detects that said load is disconnected or does not need electric energy, and to drive next one enabled transmitter-side coupling circuit in sequence to transfer electric energy in next one cycle.

10. The driving circuit according to claim 9, wherein in a case that said detection circuit detects none of said enabled transmitter-side coupling circuits is electrically coupled to said load which needs electric energy, said control circuit controls said wireless power transmitter in a standby state for a predetermined time period.

11. The driving circuit according to claim 3, wherein said configuration interface is configured to receive an enable signal for enabling one of said transmitter-side coupling circuits;
    said control circuit is configured to drive an enabled transmitter-side coupling circuit to transfer electric energy in each cycle;
    wherein said wireless power transmitter further comprises:
    a detection circuit being configured to detect whether said enabled transmitter-side coupling circuit which is active in a current cycle is electrically coupled to a load which needs electric energy or not,
    wherein in a case that said detection circuit determines that said enabled transmitter-side coupling circuit which is active in said current cycle is electrically coupled to said load which needs electric energy, said control circuit is configured to control said inverting circuit to drive said enabled transmitter-side coupling circuit which is active in said current cycle to transfer electric energy continuously until a predetermined number of cycles elapse, and to drive next one enabled transmitter-side coupling circuit in sequence to transfer electric energy after said predetermined number of cycles elapse.

12. The driving circuit according to claim 2, wherein each of said N+1 half-bridge circuits comprises a first switch and a second switch;
    said control circuit is configured to control said first switch in said i-th half-bridge circuit and said second switch in said (i+1)-th half-bridge circuit in accordance with a first pulse-width modulation signal, and to control said second switch in said i-th half-bridge circuit and said first switch in said (i+1)-th half-bridge circuit in accordance with a second pulse-width modulation signal, so as to drive said i-th transmitter-side coupling circuit to transfer energy;
    said control circuit is further configured to control said first switch and said second switch in said half-bridge circuits, except for said i-th half-bridge circuit and said (i+1)-th half-bridge circuit, to be turned off, so that said transmitter-side coupling circuits, except for said i-th transmitter-side coupling circuit, do not transfer electric energy,
    wherein said first pulse-width modulation signal and said second pulse-width modulation signal are complementary signals with or without a dead zone.

13. The driving circuit according to claim 2, wherein each of said N+1 half-bridge circuits comprises a first switch and a second switch;
    said control circuit is configured to control said first switch in said j-th half-bridge circuit and said second switch in said k-th half-bridge circuit in accordance with a first pulse-width modulation signal, and to control said second switch in said j-th half-bridge circuit and said first switch in said k-th half-bridge circuit in accordance with a second pulse-width modulation signal, to drive all of said transmitter-side coupling circuits to transfer energy simultaneously, where j is any odd number in 1 to N+1 and k is any even number in 1 to N+1,
    wherein said first pulse-width modulation signal and said second pulse-width modulation signal are complementary signals with or without a dead zone.

14. The driving circuit according to claim 13, wherein said wireless power transmitter further comprises:
    a detection circuit being configured to detect whether one of said transmitter-side coupling circuits is electrically coupled to a load which needs electric energy or not,
    wherein in a case that said detection circuit determines that said transmitter-side coupling circuit which is active in said current cycle is electrically coupled to said load which needs electric energy, said control circuit is configured to control said inverting circuit to drive all of said transmitter-side coupling circuits to transfer electric energy continuously, until said detection circuit detects that said load is disconnected or does not need electric energy.

15. The driving circuit according to claim 1, wherein said control circuit further comprises:
    a DC-DC converter being electrically coupled between power supply terminals and input terminals of said inverting circuit, and being configured to adjust an input voltage of said inverting circuit in accordance with said load.

16. A wireless power transmitter, comprising:
    N transmitter-side coupling circuits; and
    a driving circuit for driving N transmitter-side coupling circuits at a wireless power transmitter, comprising:
        an inverting circuit comprising N+1 half-bridge circuits which are connected in parallel at input terminals, wherein each of said N+1 half-bridge circuits has an output terminal; and
        a control circuit being configured to control on and off states of switches in said N+1 half-bridge circuits so that said N transmitter-side coupling circuits transfer electric energy simultaneously, alternately, or independently,
        where N is an integer larger than or equal to 2,
    wherein said N+1 output terminals are coupled in series through said N transmitter-side coupling circuits, and each of said transmitter-side coupling circuit is coupled between corresponding two adjacent output terminals.

* * * * *